(12) United States Patent
Chen et al.

(10) Patent No.: US 12,190,224 B2
(45) Date of Patent: Jan. 7, 2025

(54) PROCESSING ELEMENTS ARRAY THAT INCLUDES DELAY QUEUES BETWEEN PROCESSING ELEMENTS TO HOLD SHARED DATA

(71) Applicant: INDUSTRIAL TECHNOLOGY RESEARCH INSTITUTE, Hsinchu (TW)

(72) Inventors: Yao-Hua Chen, Changhua County (TW); Yu-Xiang Yen, Chiayi County (TW); Wan-Shan Hsieh, Taoyuan (TW); Chih-Tsun Huang, Hsinchu (TW); Juin-Ming Lu, Hsinchu (TW); Jing-Jia Liou, Hsinchu (TW)

(73) Assignee: INDUSTRIAL TECHNOLOGY RESEARCH INSTITUTE, Hsinchu (TW)

( * ) Notice: Subject to any disclaimer, the term of this patent is extended or adjusted under 35 U.S.C. 154(b) by 1045 days.

(21) Appl. No.: 17/136,744

(22) Filed: Dec. 29, 2020

(65) Prior Publication Data

US 2022/0207323 A1    Jun. 30, 2022

(51) Int. Cl.
*G06F 15/80* (2006.01)
*G06F 9/48* (2006.01)
(Continued)

(52) U.S. Cl.
CPC ........... *G06N 3/049* (2013.01); *G06F 9/4881* (2013.01); *G06F 15/8023* (2013.01);
(Continued)

(58) Field of Classification Search
CPC .. G06F 15/8023; G06F 15/8046; G06N 3/063
See application file for complete search history.

(56) References Cited

U.S. PATENT DOCUMENTS 9,710,748 B2   7/2017   Ross et al.
9,747,546 B2   8/2017   Ross et al.
(Continued)

FOREIGN PATENT DOCUMENTS

CN    107657581 A    2/2018
TW    I645301 B      12/2018
(Continued)

OTHER PUBLICATIONS

S. Subathradevi, C. Vennila. "Systolic array multiplier for augmenting data center networks communication link" Cluster Computing ( Year: 2019).*

(Continued)

*Primary Examiner* — Jacob Petranek
(74) *Attorney, Agent, or Firm* — Maschoff Brennan

(57) ABSTRACT

A processing element architecture adapted to a convolution comprises a plurality of processing elements and a delayed queue circuit. The plurality of processing elements includes a first processing element and a second processing element, wherein the first processing element and the second processing element perform the convolution according to a shared datum at least. The delayed queue circuit connects to the first processing element and connects to the second processing element. The delayed queue circuit receives the shared datum sent by the first processing element, and sends the shared datum to the second processing element after receiving the shared datum and waiting for a time interval.

3 Claims, 4 Drawing Sheets

(51) Int. Cl.
*G06N 3/049* (2023.01)
*G06N 3/063* (2023.01)
*G06F 9/50* (2006.01)

(52) U.S. Cl.
CPC ......... *G06F 15/8046* (2013.01); *G06N 3/063* (2013.01); *G06F 9/5027* (2013.01)

(56) References Cited

U.S. PATENT DOCUMENTS

| | | | |
|---|---|---|---|
| 10,467,501 | B2 | 11/2019 | N et al. |
| 10,586,148 | B2 | 3/2020 | Henry et al. |
| 11,194,490 | B1* | 12/2021 | Sunkavalli ............ G06F 3/0673 |
| 11,347,916 | B1* | 5/2022 | Desai .................... G06N 3/063 |
| 2018/0032859 | A1 | 2/2018 | Park et al. |
| 2018/0046900 | A1 | 2/2018 | Dally et al. |
| 2018/0046906 | A1 | 2/2018 | Dally et al. |
| 2018/0046916 | A1 | 2/2018 | Dally et al. |
| 2018/0121796 | A1* | 5/2018 | Deisher .................. G10L 15/16 |
| 2018/0189641 | A1 | 7/2018 | Boesch et al. |
| 2019/0114536 | A1* | 4/2019 | Tsung .................. G06F 17/156 |
| 2019/0311243 | A1* | 10/2019 | Whatmough .......... G06N 3/063 |
| 2021/0334142 | A1* | 10/2021 | Wang ................. G06F 15/8046 |

FOREIGN PATENT DOCUMENTS

| | | |
|---|---|---|
| TW | 662485 B | 6/2019 |
| TW | 201945988 A | 12/2019 |

OTHER PUBLICATIONS

Liqiang Lu, Yun Liang. "SpWA: An Efficient Sparse Winograd Convolutional Neural Networks Accelerator on FPGAs" 55th ACM/ESDA/IEEE Design Automation Conference (DAC) (Year: 2018).*

Kim et al. "A Novel Zero Weight/Activation-Aware Hardware Architecture of Convolutional Neural Network" Design, Automation & Test in Europe Conference & Exhibition (DATE), Mar. 2017.

Shin et al. "DNPU: An 8.1TOPS/W Reconfigurable CNN-RNN Processor for General-Purpose Deep Neural Networks" 2017 IEEE International Solid-State Circuits Conference (ISSCC) Feb. 2017.

Han et al. "EIE: Efficient Inference Engine on Compressed Deep Neural Network" ISCA 2016; Feb. 4, 2016.

Jouppi et al. "In-Datacenter Performance Analysis of a Tensor Processing Unit" ISCA '17: Proceedings of the 44th Annual International Symposium on Computer Architecture; Jun. 2017 pp. 1-12.

Parashar et al. "SCNN: An Accelerator for Compressed-sparse Convolutional Neural Networks" 2017 ACM/IEEE 44th Annual International Symposium on Computer Architecture (ISCA) Jun. 2017.

Lee et al. "UNPU: a 50.6TOPS/W Unified Deep Neural Network Accelerator with 1b-to-16b Fully-Variable Weight Bit-Precision" 2018 IEEE International Solid-State Circuits Conference—(ISSCC) Feb. 2018.

Chen et al. "Eyeriss: An Energy-Efficient Reconfigurable Accelerator for Deep Convolutional Neural Networks" IEEE Journal of Solid-State Circuits ( vol. 52, Issue: 1, Jan. 2017).

* cited by examiner

PROCESSING ELEMENTS ARRAY THAT INCLUDES DELAY QUEUES BETWEEN PROCESSING ELEMENTS TO HOLD SHARED DATA

TECHNICAL FIELD

The present disclosure relates to artificial intelligence, and more particularly to an artificial intelligence accelerator that runs the deep neural network.

BACKGROUND

Deep Neural Network (DNN) has developed rapidly in recent years. The accuracy of image recognition using DNN is also gradually improving, even more accurate than human recognition. In order to meet the computing requirements of DNN, artificial intelligence (AI) accelerators (that is, processors that run DNN models) must improve its hardware performance. From AI system used in wearable devices, mobile communication devices, self-driving cars and cloud servers, the required computing power increases exponentially with the number of processing elements.

Generally speaking, a dedicated DNN processor must meet the requirements of both computing power and input and output bandwidth. Increasing the number of processing elements (PE) may theoretically increase computing power, but it also requires a data network architecture suitable for a large number of processing elements to send input data to each processing element in real time. For a processing unit, the largest proportion of its circuit area is the storage component, followed by the control logic and the arithmetic logic. Taking the power consumption and circuit area associated with a large number of processing elements into consideration, how to design a good data transmission path to reduce the amount of storage components becomes an important issue when designing artificial intelligence accelerators.

SUMMARY

According to one or more embodiment of this disclosure, a processing element architecture adapted to a convolution comprising: a plurality of processing elements comprising a first processing element and a second processing element, wherein the first processing element and the second processing element perform the convolution according to a shared datum at least; and a delayed queue circuit connecting to the first processing element and the second processing element, wherein the delayed queue circuit receives the shared datum sent by the first processing element, and sends the shared datum to the second processing element after receiving the shared datum and waiting for a time interval.

According to one or more embodiment of this disclosure, a processing element cluster adapted to a convolution comprising: a first processing element set comprising a plurality of first processing elements; a second processing element set comprising a plurality of second processing elements; a bus connecting to the first processing element set and the second processing element set, the bus provides a plurality of shared data to each of the plurality of first processing elements; and a plurality of delayed queue circuits, wherein one of the plurality of delayed queue circuits connects to one of the plurality of first processing elements and connects to one of the plurality of second processing elements; another one of the plurality of delayed queue circuits connects to two of the plurality of second processing elements, and each of the plurality of delayed queue circuits sends one of the plurality of shared data; wherein each of the plurality of first processing elements of the first processing element set comprises a storage device storing said one of the plurality of shared data; and each of the plurality of second processing elements of the second processing element set does not comprises the storage device storing said one of the plurality of shared data.

According to one or more embodiment of this disclosure, an operating method for a convolution adapted to the processing element architecture of previous embodiment comprising: receiving an input datum and the shared datum by the first processing element and performing the convolution according to the input datum and the shared datum; sending the shared datum to the delayed queue circuit by the first processing element; waiting for the time interval by the delayed queue circuit; after waiting for the time interval by the delayed queue circuit, sending the shared datum to the second processing element by the delayed queue circuit; and receiving another input datum by the second processing element and perform the convolution according to said another input datum and the shared datum.

BRIEF DESCRIPTION OF THE DRAWINGS

The present disclosure will become more fully understood from the detailed description given hereinbelow and the accompanying drawings which are given by way of illustration only and thus are not limitative of the present disclosure and wherein.

DETAILED DESCRIPTION

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawings.

The present disclosure relates to the processing element (PE) array in the artificial intelligence accelerator. The processing element array is configured to compute one or more convolutions. The processing element array receives from the global buffer (GLB) the input data required for the convolution, such as the input feature map (ifmap), the kernel map, and the partial sum. There is a plurality of processing elements in the processing element array. In general, every processing element comprises the scratch pad memory (spad) configured to store said input data temporarily, the multiply accumulator (MAC), and the control logic.

Figure 1:
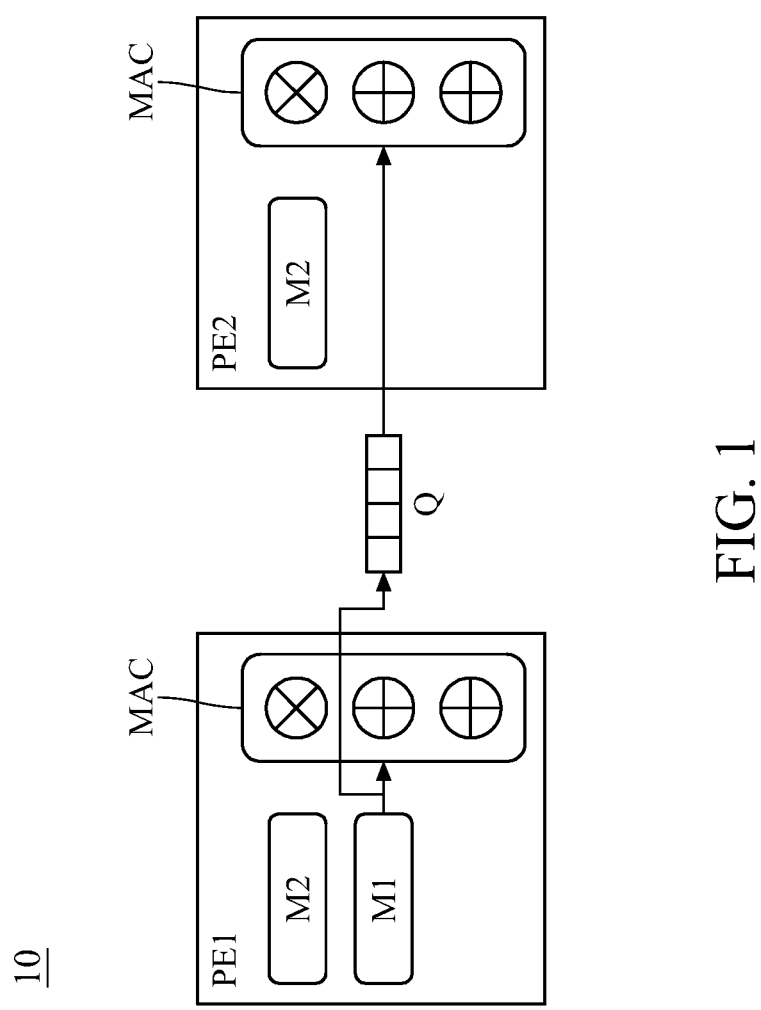
FIG. 1 is a block diagram of the processing element architecture according to an embodiment of the present disclosure.
Figure 2:
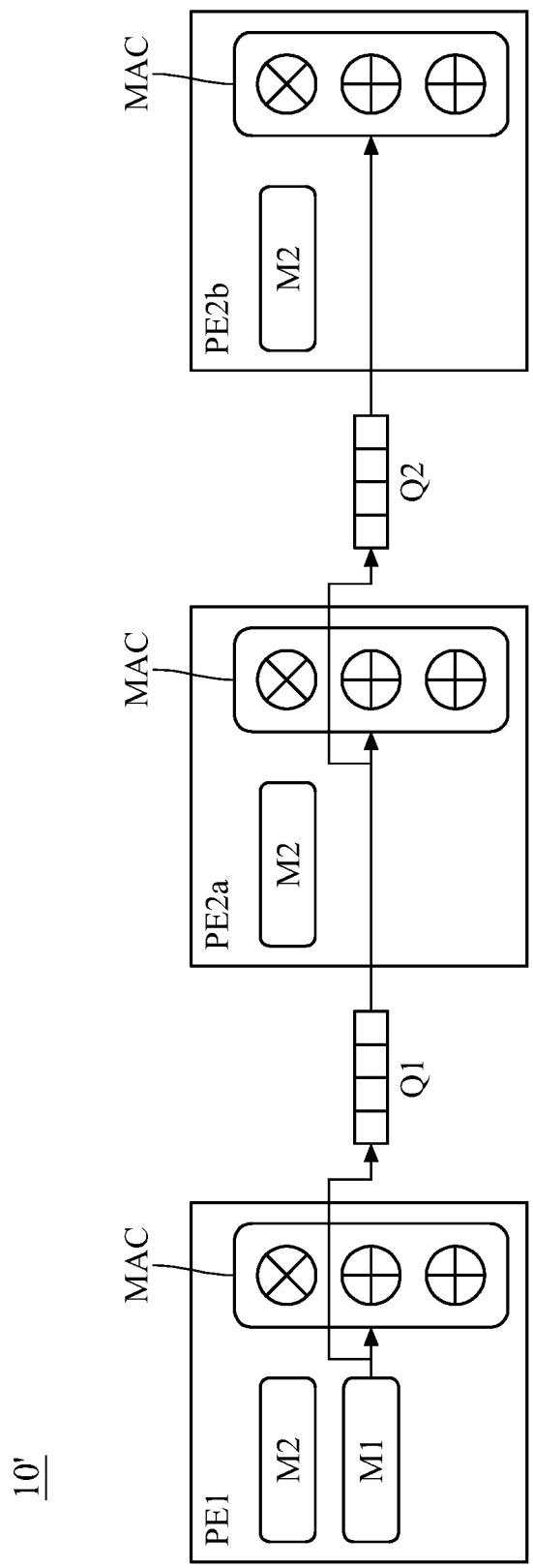
FIG. 2 is a block diagram of the processing element architecture according to another embodiment of the present disclosure.

The proposed processing element architecture in the present disclosure have two types of processing elements: the first processing element and the second processing element, wherein the number of the first processing element is one and the number of the second processing element is one or more. FIG. 1 and FIG. 2 show two embodiments regarding "one second processing element" and "two second processing elements" respectively. The embodiment with "more than two second processing elements" may be deducted from FIG. 1 and FIG. 2.

FIG. 1 is a block diagram of the processing element architecture according to an embodiment of the present disclosure. The processing element architecture is adapted to the convolution, and comprises a plurality of processing elements and a delayed queue circuit. The processing element architecture 10 shown in FIG. 1 comprises one first processing element PE1, one second processing element PE2 and one delayed queue circuit Q.

The first processing element PE1 and the second processing element PE2 perform the convolution according to the shared datum at least. In an embodiment, the shared datum is kernel map or the filter. The first processing element PE1 comprises a first storage device M1, a second storage device M2 and a computing circuit MAC. The hardware structure of the second processing element PE2 is similar to the first processing element PE1, while the difference is the second processing element PE2 does not include the first storage device M1. In practice, the first storage device M1 is configured to store the shared datum temporarily, such as the kernel map or the filter. The second storage device M2 is configured to store the private data temporarily, such as the input feature map or the partial sum. The computing circuit MAC is such as the multiply accumulator. The computing circuit performs convolution according to the kernel map obtained from the first storage device M1, the input feature map and the partial sum obtained from the second storage device M2. The kernel map belongs to the shared datum, while the input feature map and the partial sum belong to the private data. In practice, the input feature map and the partial sum may be stored in two different storage devices separately, or be stored in one storage device, and the present disclosure does not limit thereto.

The delayed queue (also known as delayed-control queue) circuit connects to the first processing element PE1 and connects to the second processing element PE2. The delayed queue circuit Q is configured to receive the shared datum sent by the first processing element PE1, and send the shared datum to the second processing element PE2 after receiving the shared datum and waiting for a time interval P. In practice, the data structure of the delayed queue circuit Q is first in-first out (FIFO). The following describe an example, wherein $T_k$ refers to the $k^{th}$ time unit and the time interval takes P time units:

at $T_k$, the first processing element PE1 sends the shared datum F1 to the delayed queue circuit Q;

at $T_{k+1}$, the first processing element PE1 sends the shared datum F2 to the delayed queue circuit Q; therefore at $T_{k+P}$, the second processing element PE2 receives the shared datum F1 from the delayed queue circuit Q; and at $T_{k+1+P}$, the second processing element PE2 receives the shared datum F2 from the delayed queue circuit Q.

In an embodiment of the present disclosure, the size of the time interval P equals to the stride value of the convolution. For example, if the stride of the convolution is two, the time interval may take two time units.

In an embodiment of the present disclosure, the size of the storage space of the delayed queue circuit Q is not smaller than the stride of the convolution. For example, if the stride of the convolution is three, and the first processing element PE1 obtains the shared datum F1 at $T_k$ and performs the convolution for the first time, the first processing element PE1 will obtain the shared datum F4 at $T_{k+1}$ and perform the convolution for the second time. However, during the interval between $T_{k+1}$ and $T_{k+2}$, the delayed queue circuit Q needs to keep the shared data F2 and F3 received from the first processing element PE1. At $T_{k+3}$, the delayed queue circuit Q sends the shared datum F1 to the second processing element PE2. Therefore, in the delayed queue circuit Q, there must be three storage units at least for storing shared data F1-F3.

FIG. 2 is a block diagram of the processing element architecture 10' according to another embodiment of the present disclosure. The processing element architecture 10' of this embodiment comprises one first processing element PE1, one second processing element PE2a, another second processing element PE2b, one delayed queue circuit Q1, and another delayed queue circuit Q2. The second processing element PE2a and said another second processing element PE2b perform the convolution according to the shared datum at least. Said another delayed queue circuit Q2 connects to the second processing element PE2a and connects to said another second processing element PE2b. In practice, a plurality of second processing elements PE2 and delayed queue circuits Q corresponding to the plurality of second processing elements PE2 respectively may be connected to the first processing element PE1 serially depending on the requirement. In view of the above, the number of delayed queue circuits in the processing element architecture 10' and the number of the second processing elements PE2 are identical.

Figure 3:
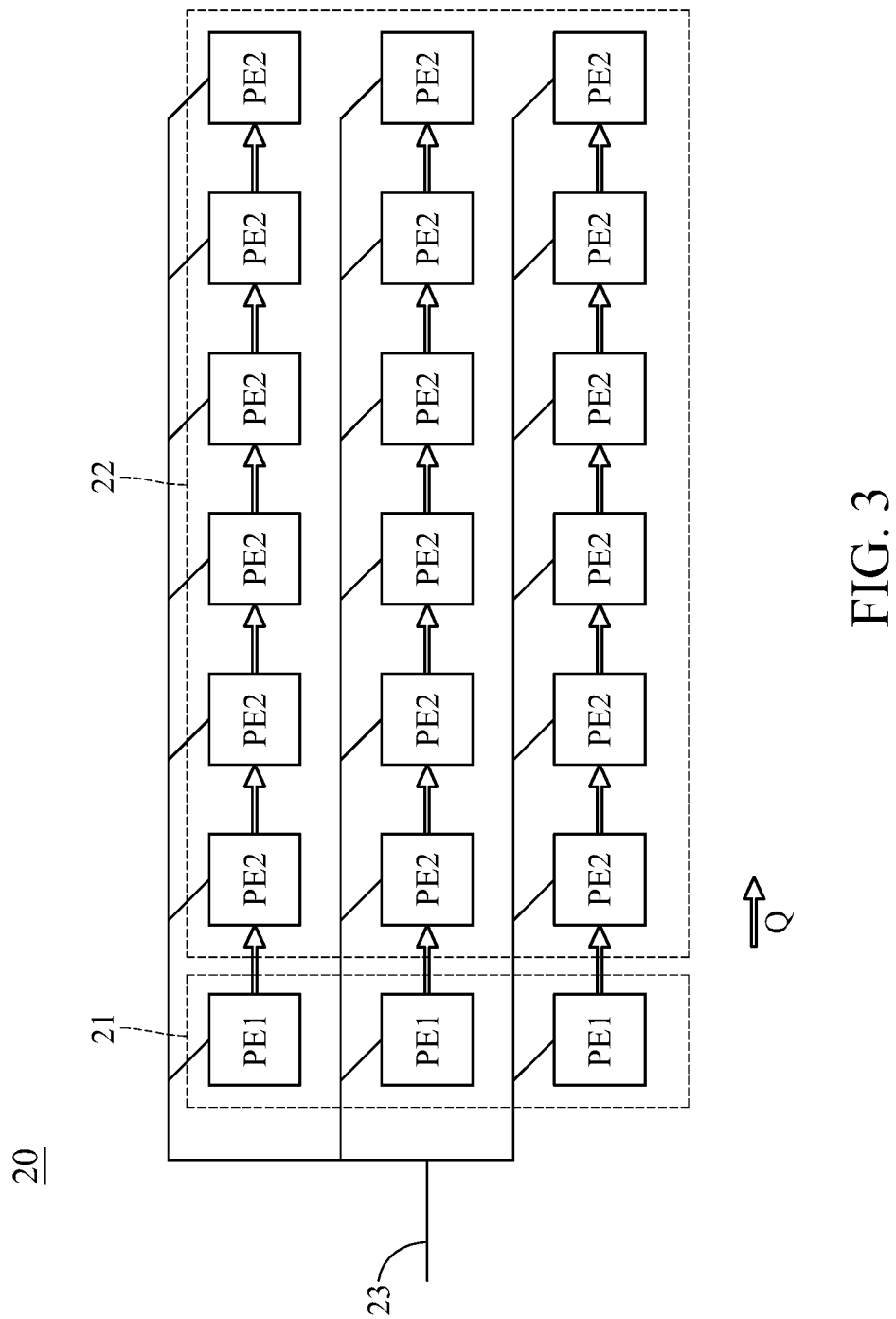
FIG. 3 is a block diagram of a processing element cluster according to an embodiment of the present disclosure.

FIG. 3 is a block diagram of a processing element cluster 20 according to an embodiment of the present disclosure. The processing element cluster 20 is adapted to the convolution and comprises a first processing element set 21, a second processing element set 22, a bus and a plurality of delayed queue circuits Q. The first processing element set 21 and the second processing element set 22 are arranged in a form of two-dimensional array with M rows and N columns. Each of the M rows have one of the plurality of first processing elements PE1 and (N−1) second processing elements PE2 of the plurality of second processing elements PE2. In the example shown in FIG. 3, M=3 and N=7. However, the present disclosure does not limit the values of M and N. The delayed queue circuits Q are divided into M sets, and each of the M sets comprises (N−1) delayed queue circuits Q.

The first processing element set 21 comprises M first processing elements PE1. Each first processing element PE1 of the first processing element set 21 is identical to the first processing element PE1 of the previous embodiment. The first processing element PE1 has a first storage device M1 configured to store the shared datum.

The second processing element set 22 comprises M×(N−1) second processing elements PE2. Each second processing element PE2 of the second processing element set 22 does not have the first storage device M1.

The bus 23 connects to the first processing element set 21 and the second processing element set 22. In an embodiment of the present disclosure, the bus 23 connects to each first processing element PE1 and each second processing element PE2. The bus 23 provides a plurality of share data to each first processing element PE1 and provides a plurality of private data to each of the first processing elements PE1 and the second processing elements PE2. The source of shared data and private data is, for example, GLB.

Please refer to FIG. 3. The number of the delayed queue circuits of the processing element cluster 20 is M×(N−1). Each delayed queue Q is configured to send the shared data.

One of the plurality of delayed queue circuits Q connects to one of the plurality of first processing elements PE1 and connects to one of the plurality of second processing elements PE2. Another one of the plurality of delayed queue circuits Q connects to two of the plurality of second processing elements PE2 and each of the plurality of delayed queue circuits Q sends one of the plurality of shared data. In other words, each first processing element PE1 of the first processing element set 21 connects to one second processing element PE2 of the second processing element set 22 via a delayed queue Q. Particularly, two second processing elements PE2 of the second processing element set 22 will connect to each other by one of the plurality of delayed queue circuits Q if they are in the same row as well as in adjacent two columns.

Figure 4:
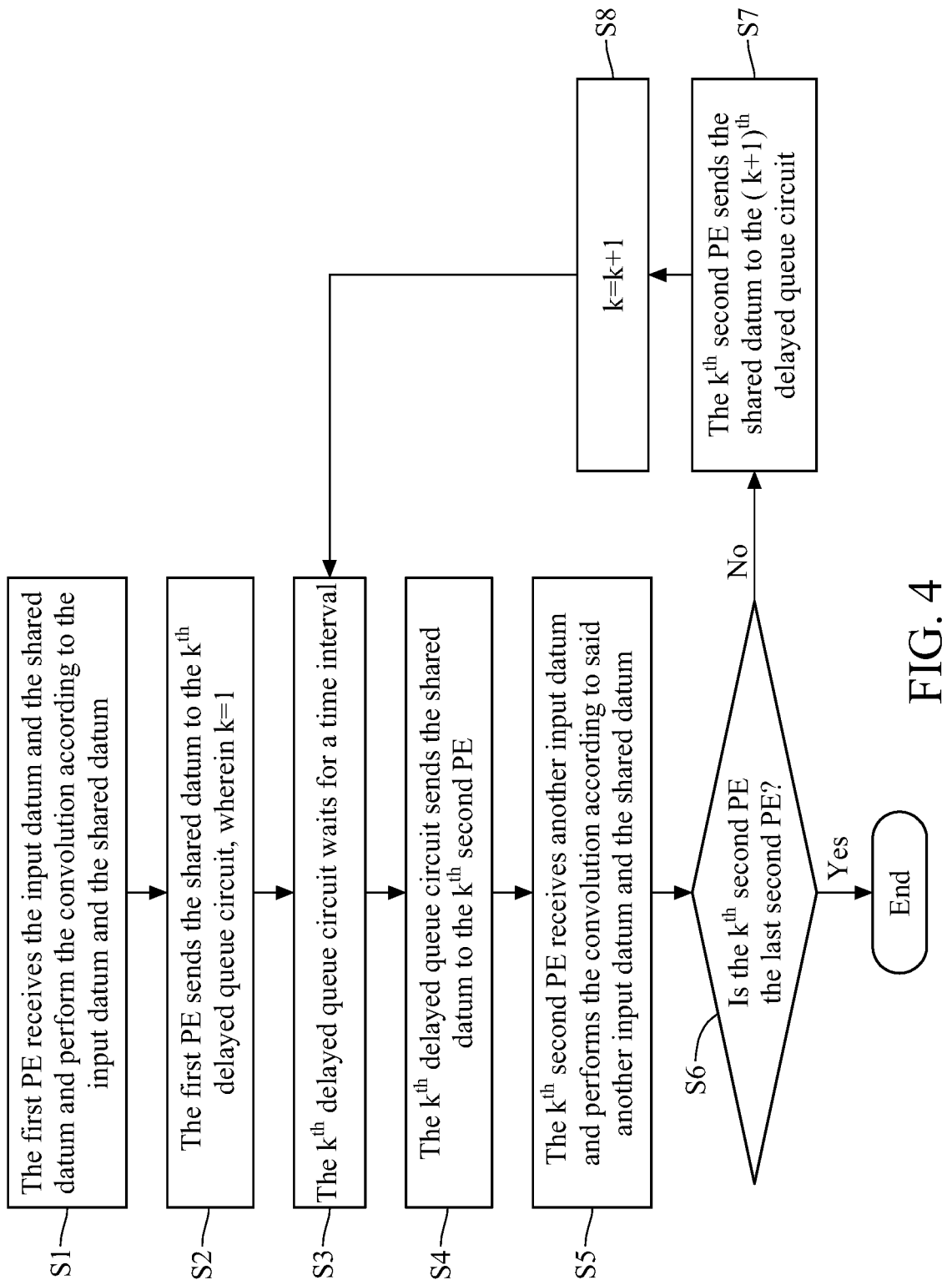
FIG. 4 is a flowchart of the operating method for convolution according to an embodiment of the present disclosure.

FIG. 4 is a flowchart of the operating method for convolution according to an embodiment of the present disclosure. This method shown in FIG. 4 is adapted to the processing element architecture 10 shown in FIG. 1, the processing element architecture 10' shown in FIG. 2, or the processing element cluster 20 shown in FIG. 3.

Step S1 shows that "the first processing element PE1 receives the input datum and the shared datum and perform the convolution according to the input datum and the shared datum". For example, the input datum and the shared datum are sent to the first processing element PE1 by the bus 23.

Step S2 shows that "the first processing element PE1 sends the shared datum to the $k^{th}$ delayed queue circuit Q, wherein k=1". The symbol "k" refers the order number of the delayed queue circuit Q and the order number of the second processing element PE2. The order to perform steps S1 and S2 is not limited in the present disclosure, therefore, steps S1 and S2 may be performed simultaneously in an embodiment.

Step S3 shows that "the $k^{th}$ delayed queue circuit Q waits for a time interval". The length of the time interval depends on the stride of the convolution.

After step S3, step S4 shows that "the $k^{th}$ delayed queue circuit Q sends the shared datum to the $k^{th}$ second processing element PE2".

Step S5 shows that "the $k^{th}$ second processing element PE2 receives another input datum and performs the convolution according to said another input datum and the shared datum".

Step S6 determines that "whether the $k^{th}$ second processing element PE2 is the last second processing element PE2". The operating method for convolution finishes if the determination is positive while step S7 is performed next if the determination of step S6 is negative.

Step S7 shows that "the $k^{th}$ second processing element PE2 sends the shared datum to the $(k+1)^{th}$ delayed queue circuit Q". Step S7 is similar to step S2. Processing elements PE1 or PE2 sends the shared datum to the next-level delayed queue circuit Q in steps S7 or S2. Step S8 shows that "k=k+1", namely increasing the value of k. The flow of steps S3-S8 may be repeated for a plurality of times according to the number of the second processing elements PE2 in the processing element architecture 10 or 10'.

In view of the above description, the processing element architecture, the processing element cluster, and the operating method for convolution proposed by the present disclosure use the design of second processing elements and delayed queue circuit to save storage devices for storing shared data. When the number of second processing elements belonging to the second processing element set in the artificial intelligence accelerator increases, the circuit area and the power consumption that can be saved by applying the present disclosure increases.

What is claimed is:

1. A processing element cluster adapted to a convolution comprising:
    a first processing element set comprising a plurality of first processing elements;
    a second processing element set comprising a plurality of second processing elements;
    a bus connecting to the first processing element set and the second processing element set, the bus provides a plurality of shared data to each of the plurality of first processing elements; and
    a plurality of delayed queue circuits, wherein one of the plurality of delayed queue circuits connects to one of the plurality of first processing elements and connects to one of the plurality of second processing elements; another one of the plurality of delayed queue circuits connects to two of the plurality of second processing elements, and each of the plurality of delayed queue circuits sends one of the plurality of shared data; wherein
    each of the plurality of first processing elements of the first processing element set comprises a storage device storing said one of the plurality of shared data; and
    each of the plurality of second processing elements of the second processing element set does not comprises the storage device storing said one of the plurality of shared data.

2. The processing element cluster of claim 1, wherein the storage device is a first storage device, and each of the plurality of first processing elements and the plurality of second processing elements further comprises:
    a second storage device storing a private datum; and
    a computing circuit electrically connecting to the first storage device and the second storage device, wherein the computing circuit performs the convolution according to said one of the plurality of shared data and the private datum.

3. The processing element cluster of claim 1, wherein
    the first processing element set and the second processing element set form a two-dimensional array with M rows and N columns, each of the M rows has one of the plurality of first processing elements and (N−1) of the plurality of second processing elements; and
    the plurality of delayed queue circuits is divided into M sets and each of the M sets has (N−1) delayed queue circuits.

* * * * *